Feb. 10, 1942.	C. M. SUMMERS	2,272,755
ELECTRICAL REGULATING APPARATUS
Filed Oct. 29, 1940
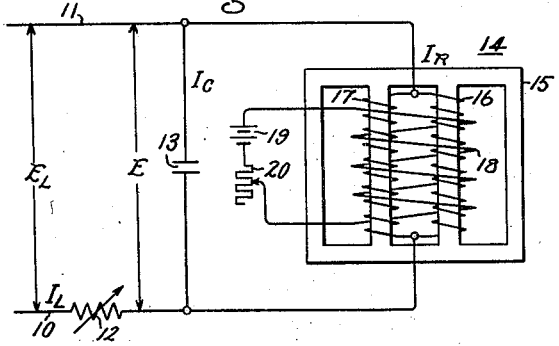
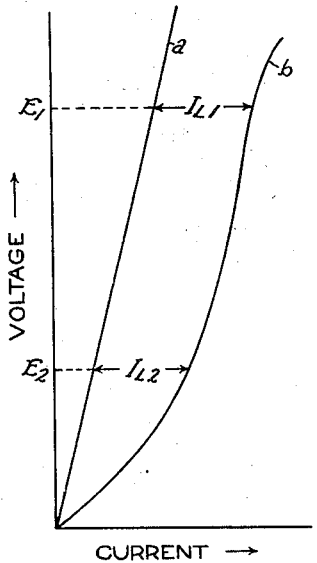
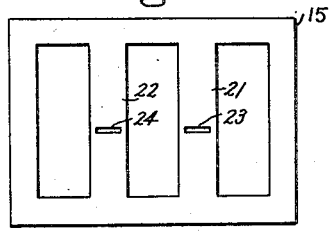
Inventor:
Claude M. Summers,
by Harry E. Dunham
His Attorney Patented Feb. 10, 1942

2,272,755

UNITED STATES PATENT OFFICE 2,272,755

ELECTRICAL REGULATING APPARATUS

Claude M. Summers, Fort Wayne, Ind., assignor to General Electric Company, a corporation of New York Application October 29, 1940, Serial No. 363,283

5 Claims. (Cl. 171—242)

My invention relates to electrical regulating apparatus, and more particularly to electrical regulating apparatus of the static type for controlling the flow of current in alternating current circuits.

Static regulators comprising a condenser and saturable inductance have been devised which will function to maintain a substantially constant current in an alternating current circuit of constant frequency within the range of operation of the regulator. These regulators, however, are expensive to manufacture because a relatively large sized condenser is needed in comparison with the amount of the regulated load current. Also, these regulators can not be used advantageously to regulate load circuits which require a series inductive ballast for proper operation of the load, for example, vapor lamp lighting circuits, because the effective impedance of these regulators is capacitive in character.

It is an object of my invention to provide a static regulator of the above type which will operate with a smaller size condenser and can therefore be constructed at a lower cost.

It is a further object of my invention to provide a regulator of the above type the effective impedance of which is inductive in character and which will, therefore, operate more satisfactorily to regulate load circuits, such as for example, vapor lamp lighting circuits which require an inductive circuit for satisfactory operation.

Further objects and advantages of my invention will become apparent as the following description proceeds, and the features of novelty which characterize my invention will be pointed out with particularity in the claims annexed to and forming a part of this specification.

According to the illustrated embodiment of my invention I provide a static current regulator comprising a parallel connected condenser and biased core type of saturable inductance. The volt-ampere curves of the condenser and inductance are so related that the regulator will maintain a constant current and function in the load circuit as an inductance rather than a capacitor as in previous regulators of this type.

My invention will be better understood from the following description taken in connection with the accompanying drawing in which Fig. 1 is a diagrammatic illustration of one embodiment of my invention; Fig. 2 shows certain curves which are useful in explaining the operation of my invention; and Fig. 3 shows a modified form of inductance core which may be used in the apparatus shown in Fig. 1.

Referring to Fig. 1 of the drawing, the alternating current supply conductors 10, 11 are connected to supply current to a load 12. The load 12 may, for example, be a variable impedance load such as a plurality of series-connected street lighting units. For the purpose of maintaining constant current in the load circuit I connect in series therewith a network comprising a parallel connected condenser 13 and biased core inductance indicated generally at 14. In the form illustrated the inductance comprises a four-legged core 15 having two parallel connected alternating current windings 16 and 17 wound in opposite directions around each of the two center legs as illustrated. Wound around both of these center legs is a biasing or saturating winding 18 energized from a source of unidirectional current such as a battery 19. The use of two reversely wound alternating current windings 16 and 17 prevents undesirable transformer action between these windings and the saturating winding 18. An adjustable resistor 20 is connected in series with the biasing winding for the purpose of controlling the current flow therein.

It is believed that the theory of operation of my regulating apparatus can be best understood by reference to the curves shown in Fig. 2 of the drawing. In Fig. 2 the curve $a$ represents the volt-ampere characteristic of the condenser 13 and the curve $b$ represents the volt-ampere characteristic of the inductance 14. Since the current $I_c$ passing through the condenser 13 is approximately 180 degrees out of phase with the current $I_R$ passing through the inductance 14, the load current $I_L$ will be equal approximately to the algebraic difference between the currents $I_R$ and $I_c$. Thus the load current may be illustrated by the horizontal distances between the curves $a$ and $b$. It will be noted that the curve $b$ is relatively straight between the points corresponding to the voltages $E_1$ and $E_2$ and is also parallel to the condenser curve $a$. Thus it is evident that as the voltage varies between the points $E_1$ and $E_2$ the load current $I_L$ will remain substantially constant. As illustrated, $I_{L1}$ is substantially equal to $I_{L2}$.

Any fluctuation in the value of either the line voltage $E_L$ or the impedance of the load 12 will, of course, cause fluctuation in the voltage $E$ across the network comprising the parallel connected condenser 13 and inductance 14. However, as long as the voltage $E$ stays within the limits between $E_1$ and $E_2$ the apparatus will function to maintain constant current in the load circuit.

It will be noted by reference to the curves $a$ and $b$ in Fig. 2 that the inductance current $I_R$ is always greater than the condenser current $I_c$ the impedance of the condenser being greater than the impedance of the inductance. Therefore, the current regulating network functions as an inductance in the load circuit which is a desirable characteristic for some types of load circuits as pointed out above.

In previous static regulators of this type using an ordinary saturable inductance it was found necessary to have the curve b fall on the opposite side of the curve a from that shown in Fig. 2 in order to make the curves parallel and thus obtain a constant current characteristic the impedance of the condenser being necessarily less than the impedance of the inductance. The reason for this was the fact that the volt-ampere curve of an ordinary saturable inductance is one of decreasing slope except for a slight reverse curve at very low voltage. Hence the curve b could not be related to the curve a as shown in Fig. 2. Thus in the prior arrangement the condenser current was always greater than the inductance current and the condenser had to supply all of the load current plus that required by the inductance.

In accordance with my invention a magnetic bias on the inductance core is supplied by the direct current winding 18 with the result that the curve b has a considerable portion of increasing slope and hence can be made parallel to the curve a on the opposite side as shown in Fig. 2 the condenser having a greater impedance than the inductance. Thus a constant current is obtained and the condenser supplies only the difference between the load current and the inductance current. Hence a much smaller condenser may be used which is desirable from a cost standpoint.

Another feature of my invention is that the volt-ampere curve of the inductance 14 and hence the value of the current maintained by the regulating apparatus may be conveniently changed by varying the amount of excitation current in the saturating or biasing winding 18. The variable resistor 20 is provided for this purpose. If the excitation current in the winding 18 is increased the straight portion of curve b will move to the right and therefore the load current, which is proportional to the horizontal distance between the curves a and b, will increase. Conversely, if the excitation current in the winding 18 is decreased, the load current will decrease.

The range of voltage and load circuit impedance for which the regulator will function to maintain constant current depends on the length of the curve b that is parallel or substantially parallel to the curve a. I have found that this length can be increased considerably by using an inductance core having a restricted core section and in Fig. 3 of the drawing I have illustrated such a core structure. The two center legs 21 and 22 of the core 15 are provided with the openings 23 and 24. By inserting shims of magnetic material in the openings 23 and 24 the volt-ampere characteristic of the inductance 14 may be conveniently varied within certain limits.

The variation in the load current $I_L$ with variations in the line voltage $E_L$ and impedance of the load 12 depends upon the relative slopes of the curves a and b. As pointed out above, when these curves are parallel within the range of operation of the device the load current $I_L$ will remain constant. However, the slopes of the curves a and b can be related to give any desired current variation by changing the volt-ampere characteristics of the condenser and the inductance.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a load circuit including an electrical load energized from a source of alternating current having a substantially constant frequency, a network connected in series with said load circuit, said network comprising a parallel connected condenser and inductance, said condenser having a greater impedance than said inductance and said condenser and inductance having volt-ampere curves which are substantially parallel for a predetermined range of voltages across said network so that the current flowing through said inductance exceeds the current flowing through said condenser by a substantially constant amount within said range.

2. A regulator for maintaining constant current in a load circuit energized from a source of alternating current having a constant frequency comprising a network adapted to be connected in series with said load circuit, said network having a parallel connected condenser and inductance, said condenser having a greater impedance than said inductance and said condenser and inductance having volt-ampere curves which are substantially parallel for a predetermined range of voltages across said network so that the current flowing through said inductance exceeds the current flowing through said condenser by a substantially constant amount within said range.

3. In combination, a condenser and an inductance connected in parallel with each other, said condenser and inductance having respective voltage-current curves which are substantially parallel for a given frequency and within a given range of voltage values, the impedance of said condenser being greater than the impedance of said inductance so that for any value of applied voltage within said range of values the current flowing through said condenser is less than the current through said inductance.

4. In an alternating current electric circuit, a reactive current device comprising parallel connected capacitive and biased inductive current elements, said elements having parallel volt-ampere curves and said capacitive element having a greater impedance than said inductance element whereby the total current drawn by said device lags the voltage across said device and remains substantially constant for varying applied voltage between predetermined limits.

5. In combination, an alternating current circuit including a reactive current device comprising a capacitance element and an inductance element having a biased saturable core provided with a restricted core section, the volt-ampere curves of said capacitance element and said inductance element being substantially parallel within a given range and the capacities element having a greater impedance than the inductance element whereby said reactive current device has a constant and lagging current characteristic within said range.

CLAUDE M. SUMMERS.